United States Patent [19]

Kobayashi et al.

[11] 3,866,155

[45] Feb. 11, 1975

[54] ATTENUATION POLE TYPE MONOLITHIC CRYSTAL FILTER

[75] Inventors: Masaki Kobayashi; Izumi Kawakami; Katuhiko Gunji, all of Tokyo, Japan

[73] Assignee: Oki Electric Industry Co., Ltd., Tokyo, Japan

[22] Filed: Sept. 14, 1973

[21] Appl. No.: 397,278

[30] Foreign Application Priority Data

Sept. 20, 1972 Japan ............................... 47-93670

[52] U.S. Cl. .................................... 333/72, 310/9.8

[51] Int. Cl. ........ H03h 9/02, H03h 9/26, H03h 9/32

[58] Field of Search .............. 333/72, 30 R; 310/9.7, 310/9.8

[56] References Cited

UNITED STATES PATENTS

| | | | |
|---|---|---|---|
| 3,517,350 | 6/1970 | Beaver | 333/72 |
| 3,564,463 | 2/1971 | Beaver et al. | 333/72 |
| 3,573,672 | 4/1971 | Fair | 333/72 |
| 3,576,506 | 4/1971 | Reynolds et al. | 333/72 |
| 3,656,180 | 4/1972 | Braun | 333/72 |
| 3,676,805 | 7/1972 | Mason | 333/72 |
| 3,716,808 | 2/1973 | Malinowski et al. | 333/72 |
| 3,732,510 | 5/1973 | Mason | 333/72 |

*Primary Examiner*—Eli Lieberman
*Assistant Examiner*—Marvin Nussbaum
*Attorney, Agent, or Firm*—Paul & Paul

[57] ABSTRACT

A monolithic crystal filter comprising a piezoelectric plate, main electrodes and an intermediate electrode provides attenuation pole characteristics at a desired frequency. The mass and thickness of said intermediate electrode are larger than those of said main electrode, that is to say, the drop in frequency due to said intermediate electrode is larger than that due to the main electrodes.

5 Claims, 17 Drawing Figures

ATTENUATION POLE TYPE MONOLITHIC CRYSTAL FILTER

BACKGROUND OF THE INVENTION

The present invention relates to an energy trapping type filter and in particular relates to an attenuation pole type monolithic crystal filter (hereinafter abbreviated to MCF) comprising a single piezoelectric plate and a plurality of electrodes provided thereon by evaporating, sputtering or silk screen method, whereby a filter function is obtained by utilizing the transmission of vibration energy between electrodes.

The main tendency of filter technology has been to employ an LC type filter having a plurality of inductances and capacitances. However, in some fields such as a miniaturized devices, or devices with integrated circuits and/or a narrow band filter, the conventional LC type filter cannot meet the desired requirements, and an active RC filter, a mechanical filter and/or a monolithic crystal filter (MCF) are used in these fields.

A monolithic crystal filter (MCF) comprises a piezoelectric plate, and its operation is considerably different from prior filters. The operational frequency of a monolithic crystal filter (MCF) is limited to the VHF band on account of the characteristics of a piezoelectric plate. The structure of a monolithic crystal filter (MCF) is very simple and requires no inductance. Further the method of manufacturing resembles to that of integrated circuits, and mass production of monolithic filters (MCF) is possible by suitably controlling the thickness of the electrodes.

A prior monolithic filter (MCF) is disclosed in the Japanese Publication of Pat. application No. 4369/1969 (Published Feb. 22, 1969). This prior monolithic crystal filter (MCF) is of non-pole type, that is to say, it has no attenuation pole at finite frequency but only at infinite frequency. However, the characteristics of non-pole type filters do not satisfy the recent severe technical requirements, and an attenuation pole type monolithic crystal filter (MCF) which has an attenuation pole at finite frequency and has steeper cut off characteristics has become necessary.

An attenuation pole type filter system can be obtained electrically using a conventional non-pole type monolithic crystal filter (MCF), for instance, together with a capacitance (or stray capacitance) between the input and output terminals thereof to provide an attenuation pole type characteristic having steeper cut off.

The disadvantage of this prior attenuation pole type filter system is that an attenuation pole cannot be obtained exactly, at a desired frequency on account of the error of the capacitance or stray capacitance.

The other disadvantage of this prior art is that the secular variation, temperature characteristics, high frequency characteristics and stability are not satisfactory.

SUMMARY OF THE INVENTION

A first object of the present invention is to provide a new and improved monolithic crystal filter (MCF) which overcomes the above-mentioned drawbacks.

Another object of the present invention is to provide a monolithic crystal filter (MCF) which provides a stable attenuation pole at a desired frequency by the feedback of vibration energy without converting vibration energy to electrical energy.

The above and other objects are attained by a monolithic crystal filter (MCF) comprising a single piezoelectric plate, a plurality of main electrodes thereon and an intermediate electrode between the main electrodes wherein the drop in frequency due to the intermediate electrode is larger than that due to the main electrodes. According to the present invention, the frequency position of an attenuation pole can easily be designed to be a desired frequency by deciding the size of the electrodes, the spaces between the electrodes and the thickness of the electrodes.

BRIEF DESCRIPTION OF THE DRAWINGS

Further features and advantages of the present invention will be apparent from the ensuing description with reference to the accompanying drawings to which, however, the scope of the invention is in no way limited.

DESCRIPTION OF THE PREFERRED EMBODIMENTS

Figure 1A:
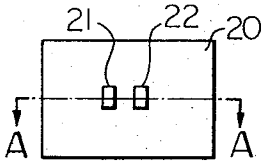
Fig. 1A PRIOR ART
FIG. 1A is a plan view of a prior monolithic crystal filter (MCF)
Figure 1B:
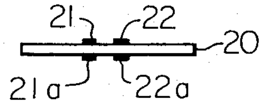
Fig. 1B PRIOR ART
FIG. 1B is a sectional view on line A—A of FIG. 1A.
Figure 1C:
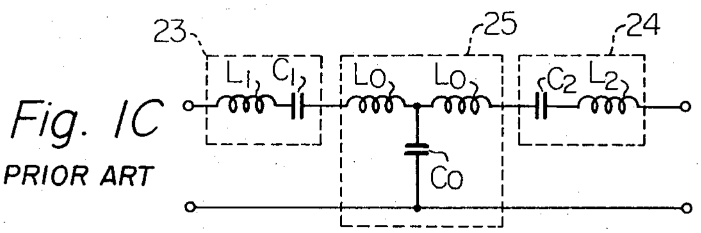
Fig. 1C PRIOR ART
FIG. 1C is an electrical equivalent circuit of the filter of FIG. 1A.

FIG. 1A is a plan view of a prior monolithic crystal filter (MCF), and FIG. 1B is its sectional view on line A—A. In these drawings, 20 is a piezoelectric plate, 21 and **21*a* are a first pair of electrodes, and 22 and 22*a* are a second pair of electrodes. A piezoelectric plate 20 is for instance, a crystal plate. Electrodes 21, 21*a* 22 and 22*a* consist of metallic thin films, and are attached on a piezoelectric plate 20** by a similar method to those used in manufacturing integrated circuits, such as evaporating, sputtering or silk screen method. A conductive lead line (not shown) is provided with each electrode to connect is with an external device. First pair of electrodes 21 and 21*a* are input electrodes, and second pair of electrodes 22 and 22*a* are output electrodes. A desired frequency band of a signal applied to first pair of electrodes 21 and 21*a* passes to second pair of electrodes 22 and 22*a*. Therefore, the monolithic crystal filter (MCF) is substantially a bandpass filter. FIG. 1C is an electrical equivalent circuit of a filter of FIG. 1A, in which the part 23 having an inductance $L_1$ and a capacitance $C_1$ corresponds to the pair of electrodes 21 and 21*a*, the part 24 having an inductance $L_2$ and a capacitance $C_2$ corresponds to pair of electrodes 22 and 22*a*, and part 25 having an inductance $L_o$ and a capacitance $C_o$ corresponds to connection means between electrodes 21, 21*a* and 22, 22*a*. A filter of FIG. 1A can only provide a non-pole type filter, and cannot provide an attenuation pole type filter which has an attenuation pole at a finite frequency.

Figure 2A:
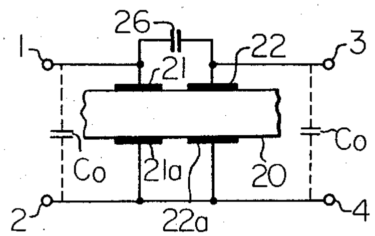
Fig. 2A PRIOR ART
FIG. 2A shows one example of a prior attenuation pole type filter using a conventional monolithic crystal filter (MCF)

FIG. 2A is an example of a prior attenuation pole type filter using a conventional monolithic crystal filter (MCF). In FIG. 2A, an attenuation pole is realized by external electrical means. A monolithic crystal filter of FIG. 2A has a piezoelectric plate 20, pairs of electrodes 21–21*a*, and 22–22*a*, input terminals 1–2, and output terminals 3–4. A capacitor 26 connected between an input terminal 1 and an output terminal 3 provides attenuation poles on both higher and lower frequencies than the center frequency $f_o$ of a filter. However, with the method of FIG. 2A, the capacitance of the capacitor 26 is extremely small since a monolithic crystal filter (MCF) has very narrow pass band. Therefore, the positions of the attenuation poles are unstable and the design of the filter including a capacitor 26 is extremely difficult.

Figure 2B:
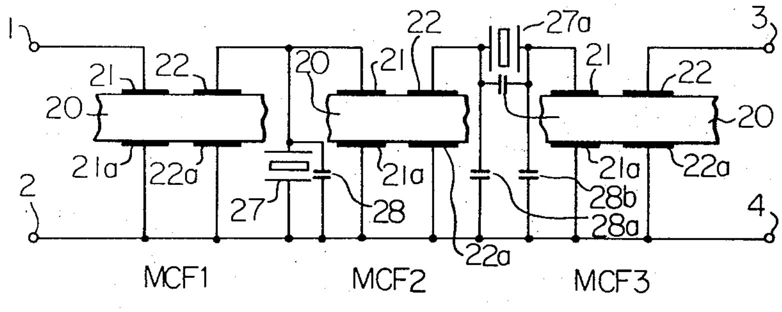
Fig. 2B PRIOR ART
FIG. 2B is another example of a prior attenuation pole type filter using a conventional monolithic crystal filter (MCF)

FIG. 2B is another example of a prior attenuation pole type filter using a conventional monolithic crystal filter (MCF). In this case also an attenuation pole is provided by external electrical means. In FIG. 2B, three similar monolithic crystal filters MCF1, MCF2 and MCF3, and quartz-crystal oscillators 27 and 27*a* are included in a filter system. An attenuation pole at lower frequency is realized by the quartz-crystal oscillator 27 and capacitor 28 connected between electrodes 21 and 22 of MCF1 and MCF2, and common line 2–4, and an attenuation pole at higher frequency is realized by anti-resonance by a quartz-crystal oscillator 27*a* and capacitors 28*a*, 28*b* and 28*c*, connected between the output electrode 22 of MCF2 and the input electrode 21 of MCF3. However, the disadvantage of the attenuation pole type filter system of FIG. 2B is that stray and/or distributed capacity affects the stability, so that the position of the higher attenuation pole is unstable.

Figure 2C:
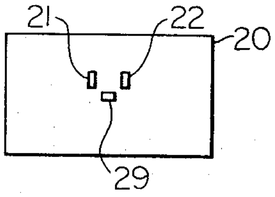
Fig. 2C PRIOR ART
FIG. 2C is a further example of a prior attenuation pole type filter.

FIG. 2C is another embodiment of a prior attenuation pole type filter. The filter of FIG. 2C comprises a piezoelectric plate 20, an input electrode 21, an output electrode 22 and third electrode 29.

The third electrode 29 is positioned outside of the straight line between electrodes 21 and 22, and has the same thickness and mass as electrodes 21 and 22. In the filter of FIG. 2C, an oscillatory wave from input electrode 21 goes to output electrode 22 directly and through the third electrode 29, and the oscillatory waves from said two paths are added. Thus an attenuation pole is realized on account of the difference of the propagation length of the waves in two paths. However, since the connection between said three electrodes is due to the wave motion of the cut off mode, the phase of the wave does not change even if the propagation length is adjusted. Accordingly, the filter of FIG. 2C provides an attenuation pole only at higher frequency, but does not provide it at lower frequency.

Figure 3A:
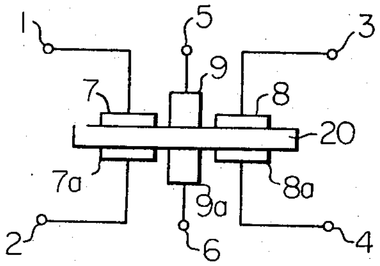
FIG. 3A is an embodiment of a monolithic crystal filter (MCF) according to the present invention, having an intermediate electrode as a phase invertor.

FIG. 3A is a first embodiment of an attenuation pole type monolithic crystal filter (MCF) according to the present invention. The filter of FIG. 3A is often called a multi-mode type filter and utilizes the feedback effect of the mechanical oscillatory wave. The filter of FIG. 3 comprises a piezoelectric plate 20, a first pair of main electrodes 7, 7*a*, a second pair of main electrodes 8, 8*a*, and a pair of intermediate electrodes 9, 9*a*. These electrodes are attached on both sides of the piezoelectric plate 20, by evaporating, sputtering or printing. The piezoelectric plate 20 is, for instance, a quartz-crystal plate. The drop in frequency D*i* due to the intermediate electrode 9 or 9*a* is larger than that D*m* due to the main electrode 7, 7*a*, 8 or 8*a*, that is to say, the intermediate electrodes 9 and 9*a* are usually thicker than the main electrodes, 7, 7*a*, 8 and 8*a*. The amount of the drop in frequency is defined as follows;

$$D = (f_s - f_e / f_s )$$

where $f_s$ is the resonant frequency for thickness vibration of the piezoelectric plate on the condition that the area of the plate were very wide, and $f_e$ is the resonant frequency of the thickness vibration on the condition that the conductive material of the electrode were attached on the whole surface of the piezoelectric plate 20, $f_e$ is called the cut-off frequency of the electrode, and usually $f_e$ is smaller than $f_s$ on account of the mass of the electrode material. On the other hand, the natural frequency $f_n$ of the electode is defined as the resonant frequency for thickness vibration of the piezoelectric plate which has a piece of an electrode of the area actually manufactured.

In FIG. 3A, the cut-off frequency of suitably designed intermediate electrodes 9 – 9*a* is lower than that of main electrodes 7 – 7*a*, and 8 – 8*a*, and the sign of the impedance of the connection means in the equivalent circuit of the filter with intermediate electrodes is different from that without intermediate electrodes at the natural frequency $f_n$ of the main electrodes. That is to say, said sign changes if the cut-off frequency of the connection means becomes lower than the cut-off frequency of the main electrodes due to the presence of the intermediate electrode.

Accordingly, suppose that the connection means between main electrodes is the intermediate electrodes 7 – 7*a* and 8 – 8*a* then, the phase of the gyrator of the connection means, i.e., the intermediate electrodes differs by 180° from the initial phase, i.e., it is opposite to the phase of the gyrator of the connection means without intermediate electrodes.

Figure 3B:
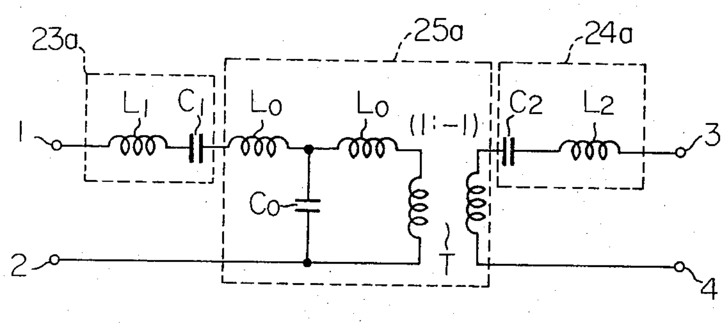
FIG. 3B is an electrical equivalent circuit of a filter of FIG. 3A.

An electrical equivalent circuit of FIG. 3A is shown in FIG. 3B, in which part 23*a* having an inductance $L_1$ and a capacitance $C_1$ corresponds to main electrodes 7 – 7*a*, part 25*a* having an inductance $L_o$, a capacitance $C_o$ and a transformer T of turn ratio 1 : −1 corresponds to intermediate electrodes 9 – 9*a*, and part 24*a* having an inductance $L_2$ and a capacitance $C_2$ corresponds to main electrodes 8 – 8*a*. The equivalent circuit of 3B is equivalent to the circuit of FIG. 3C, part 25*a'* corresponding to part 25*a*. The *E* matrix $F_1$ of part 25 of FIG. 1C is as follows.

$$[F_1] = j\begin{bmatrix} 0 & \omega_0 L \\ \frac{1}{\omega_0 C_0} & 0 \end{bmatrix},$$

Figure 3C:
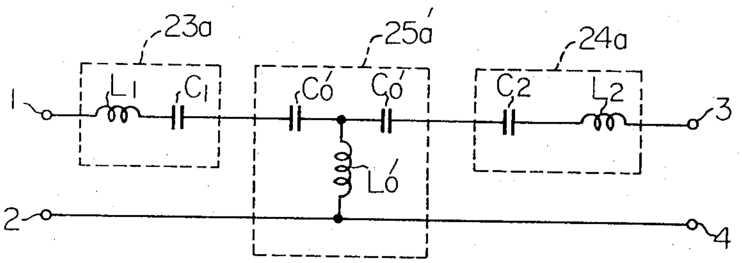
FIG. 3C is also an electrical equivalent circuit of a filter of FIG. 3A in the other alternative.

Accordingly, part 25 is a gyrator at the frequency $\omega_0 L = (+1/\omega_0 C_0)$. The $F$ matrix $F_2$ of part 25*a'* of FIG. 3C is $$[F_2] = -[F_1].$$

As apparent from above explanation of the equivalent circuit and $F$ matrix the sign of the gyrator changes.

A filter having an intermidiate electrode shown in FIG. 3A can provide a stable attenuation pole on a desired higher or lower frequency by utilizing the above-mentioned phase invertor effect of the gyrator, without any external element or distributed capacity.

Terminals 5 and 6 connected to intermediate electrodes 9 and 9*a* are used to adjust the characteristics of the filter during manufacture, and are short circuited in operation.

Figure 3D:
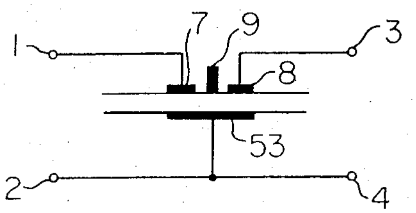
FIG. 3D shows a modification of the structure of a filter of FIG. 3A.

FIG. 3D is a modification of structure of FIG. 3A, a filter of FIG. 3D has a common electrode 53 instead of separate electrodes 7*a*, 8*a* and 9*a*, and has similar characteristics to the structure of FIG. 3A.

Figure 4A:
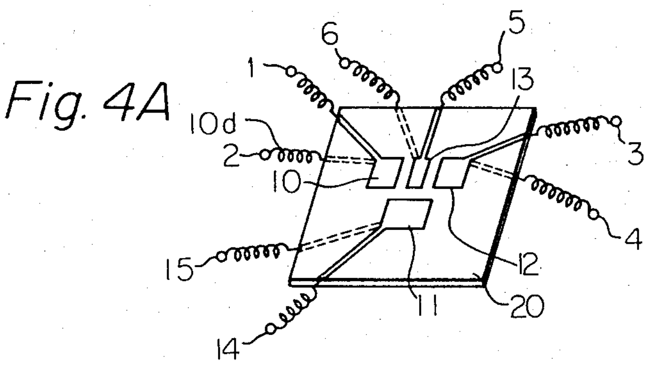
FIG. 4A is another embodiment of a monolithic crystal filter (MCF) according to the present invention.

FIG. 4A is another embodiment of a structure of a monolithic crystal filter (MCF) according to the present invention. The structure of FIG. 4A comprises a piezoelectric plate 20, three pairs of main electrodes 10, 11, 12 on said plate 20, and an intermediate electrode 13 as a phase invertor between main electrodes 10 and 12. Terminals 5, 6 of the intermediate electrode 13, and terminals 14, 15 of the main electrode 11 are respectively short circuited in operation. The pair of electrodes 10 are connected to input terminals 1 and 2 through lead lines, and the pair of electrodes 12 are connected to out-put terminals 3 and 4 also through lead lines. In FIG. 4A, a vibration signal propagates from the main electrode 10 through the main electrode 11 to the main electrode 12, and along the other path from the main electrode 10 through the intermediate electrode 13 to the main electrode 12. Said intermediate electrode 13 inverts the phase of the vibration wave. The vibration waves through said two paths are added automatically at the main electrode 12, and an attenuation pole is obtained due to the phase difference of the waves along the two paths.

Figure 4B:
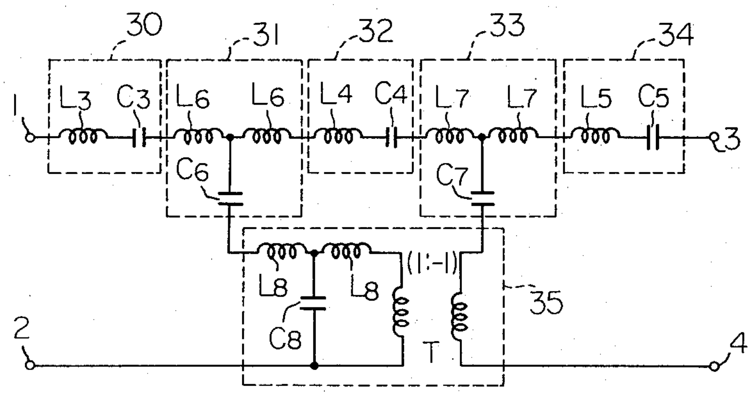
FIG. 4B is an electrical equivalent circuit of the filter of FIG. 4A.

FIG. 4B is an electrical equivalent circuit of the structure of FIG. 4A. In FIG. 4B, part 30 having an inductance $L_3$ and a capacitance $C_3$ corresponds to the main electrode 10, part 32 having an inductance $L_4$ and a capacitance $C_4$ corresponds to the main electrode 11, and part 34 having an inductance $L_5$ and a capacitance $C_5$ corresponds to the main electrode 12. Further, part 31 having an inductance $L_6$ and a capacitance $C_6$ corresponds to the connection means between the main electrodes 10 and 11, part 33 having an inductance $L_7$ and a capacitance $C_7$ corresponds to the connection means between the main electrodes 11 and 12, and part 35 having an inductance $L_8$, a capacitance $C_8$ and a transformer T of turn ratio 1 : −1 corresponds to the intermediate electrode 13.

Figure 4C:
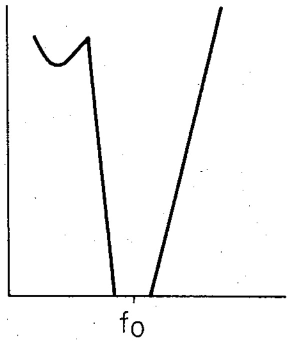
FIG. 4C is a characteristics curve of the filter of FIG. 4A.

FIG. 4C is one example of a characteristics curve of the filter of FIG. 4A. Its horizontal axis represents frequency and its vertical axis represents attenuation (dB). In FIG. 4C it should be noted that there is an attenuation pole at a lower frequency than the center frequency $f_o$.

Figure 5A:
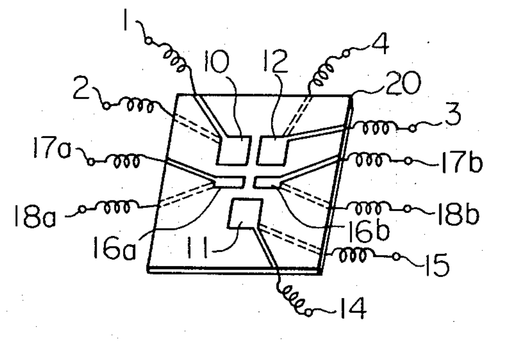
FIG. 5A is yet another embodiment of a monolithic crystal filter (MCF) according to the present invention.

FIG. 5A is another embodiment of a structure of a monolithic crystal filter (MCF) according to the present invention. In FIG. 5A, a main electrode 10 is connected to input terminals 1 and 2 through lead lines, and a main electrode 12 is connected to output terminals 13 and 14 through lead lines. Intermediate electrodes 16*a* and 16*b* are positioned as phase invertors between main electrodes 10 and 11 and between main electrodes 11 and 12, respectively. The drop in frequency due to intermediate electrode 16*a* or 16*b* is larger than that due to a main electrode 10, 11 or 12, that is to say, the mass and thickness of an intermediate electrode are larger than those of a main electrode. Pairs of terminals 17*a* – 18*a*, 17*b* – 18*b* and 14 – 15 are used as adjusting means in manufacture and are short circuited in operation.

Figure 5B:
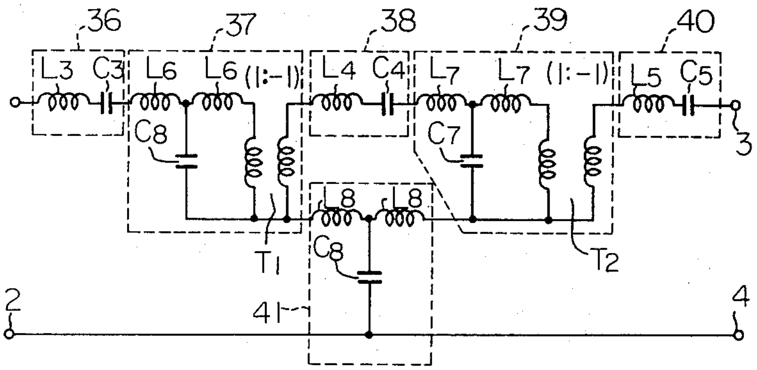
FIG. 5B is an electrical equivalent circuit of a filter of FIG. 5A.

FIG. 5B is an electrical equivalent circuit of the filter of FIG. 5A. In FIG. 5B, part 36 having an inductance $L_3$ and a capacitance $C_3$ corresponds to the main electrode 10, part 38 having an inductance $L_4$ and a capacitance $C_4$ corresponds to the main electrode 11, part 40 having an inductance $L_5$ and a capacitance $C_5$ corresponds to the main electrode 12, part 37 having an inductance $L_6$, capacitance $C_6$ and a transformer $T_1$ of turn ratio 1 : −1 corresponds to the intermediate electrode 16*a*, part 39 having an inductance $L_7$, capacitance $C_7$ and a transformer $T_2$ of turn ratio 1 : −1 corresponds to the intermediate electrode 16*b*, and part 41 having an inductance $L_8$ and a capacitance $C_8$ corresponds to connecting means between intermediate electrodes 16*a* and 16*b*.

Figure 5C:
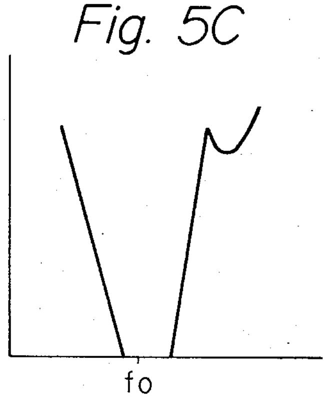
FIG. 5C is a characteristics curve of a filter of FIG. 5A.

FIG. 5C is an example of a characteristics curve of the filter of FIG. 5A. Its horizontal axis represents frequency and its vertical axis represents attenuation (dB).

Figure 6:
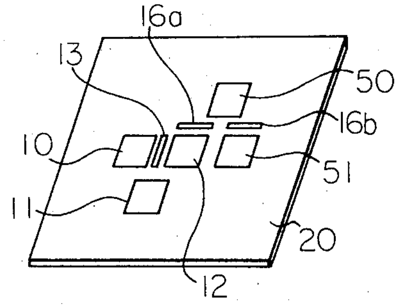
FIG. 6 shows still another embodiment of a monolithic crystal filter according to the present invention

FIG. 6 is still another embodiment of a monolithic crystal filter (MCF) according to the present invention. The filter of FIG. 6 combines the structure of FIG. 4A and FIG. 5A in order to have attenuation poles both on higher and lower frequencies. In FIG. 6, the arrangement of main electrodes 10, 11, 12 and intermediate electrode 13 on a piezoelectric plate 20 is the same as with the filter of FIG. 4A, and further, the arrangement of main electrodes 12, 50, 51 and intermediate electrodes 16*a* and 16*b* on the plate 20 is the same as with the filter of FIG. 5A. Accordingly, the structure of FIG. 6 comprises both the structures of FIG. 4A and FIG. 5A on a single piezoelectric plate and has the advantages of both the filters of FIG. 4A and FIG. 5A.

It should further be understood that a filter having more than two attenuation poles on both higher and lower frequencies respectively is easily designed by increasing the number of main electrodes and intermediate electrodes on a single piezoelectric plate, each basic section being organized in the manner of FIG. 4A or FIG. 4B. Further the philosophy of the present invention can be applied to a monolithic crystal filter whose electrode on one surface of a piezoelectric plate is common to all pairs of electrodes, such as that of FIG. 3E.

From the foregoing it will now be apparent that a new and improved monolithic crystal filter has been found. Since an intermediate electrode operates as a phase invertor of a mechanical oscillatory wave, and stable attenuation poles are obtained on both higher and lower frequencies than the center frequency $f_0$ of a filter, a steeper cut-off characteristic of a bandpass filter is realized. It should be understood of course that the embodiments disclosed are merely illustrative and are not intended to limit the scope of the invention. Reference should be made to the appended claims, therefore, rather than the specification, as indicating the scope of the invention.

Finally, the important reference numbers in this specification are enumerated below.

1, 2: input terminal
3, 4: output terminal
5, 6: terminal of an intermediate electrode
7, 8: main electrode
9: intermediate electrode
10, 11: main electrode
12: main electrode
13: intermediate electrode
14, 15: terminal of main electrode
**16*a*, 16*b*:** intermediate electrode
a, a,**17*b*, 18*a*, 18*b*:** terminal of an intermediate electrode
20: piezoelectric plate
**21, 21*a*, 22, 22*a*:** electrode
**23, 23*a*, 24, 24*a*, 25, 25*a*, 25*a*':** equivalent circuit
26: capacitance
**27, 27*a*:** quartz-crystal oscillator
**28, 28*a*, 28*b*, 28*c*:** capacitor
29: main electrode
30 – 41: equivalent circuit
50, 51: main electrode
53: common electrode

What is claimed is:

1. An attenuation pole type monolithic crystal filter comprising:

a. a piezoelectric plate;

b. a plurality of pairs of main electrodes arranged on said plate, first and second pairs of which are connected respectively to input and output terminals; and c. at least a pair of intermediate electrodes positioned on said plate between successive pairs of said main electrodes in a plane defined by said main electrodes, said intermediate electrodes being electrically distinct from said successive pairs of main electrodes;

d. wherein the drop in frequency due to said intermediate electrode is larger than the drop in frequency due to said main electrodes;

e. all main electrodes being an energy trapping type electrode which generates a standing wave of mechanical oscillation therebeneath;

f. and said intermediate electrode having a mass per unit area larger than said one main electrode, said intermediate electrode operating to couple energy of said standing wave with the next successive main electrode by inverting the phase of said standing wave by 180°.

2. An attenuation pole type monolithic crystal filter as defined in claim 1, wherein there are three pairs of main electrodes and a pair of intermediate electrodes.

3. An attenuation pole type monolithic crystal filter as defined in claim 1, wherein there are three pairs of main electrodes and two pairs of intermediate electrodes.

4. An attenuation pole type monolithic crystal filter as defined in claim 1, wherein said piezoelectric plate is a quartz-crystal plate.

5. An attenuation pole type monolithic crystal filter as defined in claim 1, wherein an electrode on one side of said piezoelectric plate is common to all main and intermediate electrodes.

* * * * *